US 10,308,823 B2
(12) United States Patent
Okada et al.

(10) Patent No.: US 10,308,823 B2
(45) Date of Patent: *Jun. 4, 2019

(54) NEAR-INFRARED ABSORBING FINE PARTICLE DISPERSION LIQUID AND METHOD FOR PRODUCING THE SAME

(71) Applicant: SUMITOMO METAL MINING CO., LTD., Tokyo (JP)

(72) Inventors: Mika Okada, Isa (JP); Hideaki Fukuyama, Isa (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/546,934

(22) PCT Filed: Jan. 27, 2016

(86) PCT No.: PCT/JP2016/052403
§ 371 (c)(1),
(2) Date: Jul. 27, 2017

(87) PCT Pub. No.: WO2016/121845
PCT Pub. Date: Aug. 4, 2016

(65) Prior Publication Data
US 2018/0016451 A1 Jan. 18, 2018

(30) Foreign Application Priority Data
Jan. 27, 2015 (JP) .................................. 2015-013422

(51) Int. Cl.
*C09D 11/037* (2014.01)
*C09D 17/00* (2006.01)
(Continued)

(52) U.S. Cl.
CPC .............. *C09D 11/037* (2013.01); *C09C 1/02* (2013.01); *C09D 11/033* (2013.01); *C09D 17/00* (2013.01);
(Continued)

(58) Field of Classification Search
CPC ....... C09C 1/02; C09D 11/033; C09D 11/037; C09D 11/50; C09D 17/007;
(Continued)

(56) References Cited

U.S. PATENT DOCUMENTS

2006/0178254 A1* 8/2006 Takeda .................. C01G 41/00 501/1
2011/0248225 A1 10/2011 Mamak et al.
2018/0016459 A1* 1/2018 Okada .................. C09D 17/007

FOREIGN PATENT DOCUMENTS

JP H04-320466 A 11/1992
JP 2000-309736 A 11/2000
(Continued)

OTHER PUBLICATIONS

Apr. 26, 2016 International Search Report issued in International Patent Application No. PCT/JP2016/052403.
(Continued)

*Primary Examiner* — Bijan Ahvazi
(74) *Attorney, Agent, or Firm* — Oliff PLC

(57) ABSTRACT

A near infrared absorbing fine particle dispersion liquid, which can be applied to offset printing, including: a solvent of one or more kinds selected from vegetable oils and vegetable oil-derived compounds; near infrared ray-absorbing fine particles of one or more kinds selected from composite tungsten oxide expressed by MxWyOz or tungsten oxide having a Magneli phase expressed by a general formula WyOz; a solvent of one or more kinds selected from alcohols, ethers, esters, ketones, aromatic hydrocarbons and
(Continued)

glycol ethers and having a boiling point of 180° C. or less, wherein a content of the solvent of one or more kinds selected from alcohols, ethers, esters, ketones, aromatic hydrocarbons and glycol ethers is 5 mass % or less.

15 Claims, 4 Drawing Sheets

(51) Int. Cl.
    *C09K 3/00*     (2006.01)
    *C09C 1/02*     (2006.01)
    *C09D 11/033*     (2014.01)
    *C09D 11/50*     (2014.01)

(52) U.S. Cl.
    CPC ............ *C09K 3/00* (2013.01); *C01P 2002/76* (2013.01); *C01P 2002/77* (2013.01); *C01P 2004/62* (2013.01); *C01P 2004/64* (2013.01); *C01P 2004/80* (2013.01); *C09D 11/50* (2013.01)

(58) Field of Classification Search
    CPC .............. C01P 2002/76; C01P 2002/77; C01P 2004/62; C01P 2004/64; C01P 2004/80; C09K 3/00

See application file for complete search history.

(56) References Cited

FOREIGN PATENT DOCUMENTS

| | | | |
|---|---|---|---|
| JP | 2006-143778 A | 6/2006 | |
| JP | 2006143778 | * 6/2006 | ............. C09D 11/02 |
| JP | 2008-291167 A | 12/2008 | |
| JP | 2008291167 | * 12/2008 | ............. C09D 11/02 |
| JP | 4626284 B2 | 2/2011 | |
| JP | 2012-229388 A | 11/2012 | |
| JP | 2012-532822 A | 12/2012 | |
| JP | 2013-112791 A | 6/2013 | |
| JP | 2013-526625 A | 6/2013 | |
| JP | 2015-117353 A | 6/2015 | |
| WO | 2005/037932 A1 | 4/2005 | |
| WO | 2012/128332 A1 | 9/2012 | |

OTHER PUBLICATIONS

Apr. 26, 2016 Written Opinion issued in International Patent Application No. PCT/JP2016/052403.

* cited by examiner

NEAR-INFRARED ABSORBING FINE PARTICLE DISPERSION LIQUID AND METHOD FOR PRODUCING THE SAME

TECHNICAL FIELD

The present invention relates to a near infrared absorbing fine particle dispersion liquid having an absorption ability in a near infrared region and applicable to offset printing and a method for producing the same. The "near infrared absorbing fine particles" in the present invention and the "near infrared absorbing material fine particles" in the prior application based on the priority right are the same fine particles.

DESCRIPTION OF RELATED ART

There are various kinds of printing technologies depending on the purpose of use and the like. Among them, offset printing is capable of high-precision printing and has characteristics that it is suitable for mass printing. In the offset printing, a dispersion liquid of a pigment used from its printing principle is lipophilic, and in the offset printing, it is required to have a property of not dissolving a rubber blanket to which a printing ink containing the dispersion liquid is transferred.

On the other hand, in recent years, for example, for the purpose of preventing counterfeiting or the like, it is considered that data is printed on various tickets and certificates, etc., by using a pigment in which an infrared absorbing material is used, and various information management is performed by reading the data using an infrared judgment device or the like.

In such an application, a lot of data is printed on a large amount of paper medium, and therefore it is considered to use the offset printing as a printing method.

Further, when an infrared absorbing material is transparent in a visible light region, it can not be determined in appearance that the infrared absorbing material is printed as a pigment. This is preferable from a viewpoint of anti-counterfeiting and the like and does not visually obstruct an original printed display, and therefore this is also preferable from a viewpoint of visibility and beautiful appearance.

As an example using the infrared absorbing material, for example, Patent Document 1 proposes an example using a phthalocyanine compound.

Further, Patent Document 2 proposes an example using tin-doped indium oxide.

Inventors of the present invention disclose composite tungsten oxide fine particles expressed by a general formula $M_wW_yO_z$ (M is an element of one or more kinds selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x/y \leq 1$, and $2.2 \leq z/y \leq 3.0$) fine particles, and a magneli phase expressed by the general formula $W_yO_z$ (W is tungsten, O is oxygen, satisfying $2.45 \leq z/y \leq 2.999$) fine particles, and which is a material having a high visible light transmittance and a near infrared absorbing function.

[Patent Document 1] Japanese Patent Laid-Open Publication No. 1992-320466

[Patent Document 2] Japanese Patent Laid-Open Publication No. 2000-309736

[Patent Document 3] Japanese Patent Publication No. 4626284

SUMMARY OF THE INVENTION

Problem to be Solved by the Invention

According to studies by inventors of the present invention, an organic pigment such as a phthalocyanine compound used in Patent Document 1, involves a problem that its infrared absorption property is changed due to an influence of temperature, ultraviolet rays, and the like, resulting in poor durability.

Further, the infrared absorbing material using tin-doped indium oxide used in Patent Document 2, involves a problem that reading accuracy of a printing unit and the like are deteriorated because contrast is insufficient in a wavelength region in which light is transmitted and reflected as a visible light and in a wavelength region in which light is absorbed as an infrared light.

In contrast, the near infrared absorbing fine particles described in Patent Document 3, are dispersed in an organic solvent such as toluene, and therefore there is a possibility that it dissolves a rubber blanket and cannot be used for the offset printing.

Therefore, the inventors of the present invention attempt to add and disperse the near infrared absorbing fine particles called composite tungsten oxide fine particles expressed by a general formula $M_xW_yO_z$ or tungsten oxide fine particles having a magnetized phase expressed by a general formula $W_yO_z$, in vegetable oils and vegetable oil-derived compounds used as solvents for the offset printing. However, it is also found that a viscosity of the dispersion liquid is increased and it is difficult to pulverize the near infrared absorbing fine particles or disperse it in the solvent.

Under such a circumstance, the present invention is provided, and an object of the present invention is to provide a near infrared absorbing fine particle dispersion liquid having an absorption ability in the near infrared region and can be applied to the offset printing with clear contrast, and a method for producing the same.

Means for Solving the Problem

In order to solve the abovementioned problem, as a result of intensive research by the inventors of the present invention, it is found that instead of adding near infrared absorbing fine particles to a solvent of one or more kinds selected from vegetable oils or vegetable oil-derived compounds and pulverizing and dispersing them, the near infrared absorbing fine particles are first mixed into a solvent of one or more kinds selected from alcohols, ethers, esters, ketones, aromatic hydrocarbons and glycol ethers and having a boiling point of 180° C. or less (referred to as "a first solvent" in some cases hereafter in the present invention), which is then pulverized and dispersed, and further the first solvent is substituted with the solvent of one or more kinds selected from the vegetable oil or the vegetable oil-derived compounds (referred to as "a second solvent" in some cases hereafter in the present invention). Thus, the present invention is completed.

Namely, in order to solve the abovementioned problem, according to a first invention, there is provided a near infrared absorbing fine particle dispersion liquid, including:

a solvent of one or more kinds selected from vegetable oils and vegetable oil-derived compounds;

near infrared absorbing fine particles of one or more kinds selected from composite tungsten oxide expressed by MxWyOz (M is H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, and O is oxygen, satisfying $0.001 \leq x/y \leq 1$, $2.2 \leq z/y \leq 3.0$), or a tungsten oxide having a Magneli phase expressed by a general formula $W_yO_z$ (W is tungsten, O is oxygen, satisfying $2.45 \leq z/y \leq 2.999$), and a solvent of one or more kinds selected from alcohols, ethers, esters, ketones, aromatic hydrocarbons, and glycol ethers and having a boiling point of 180° C. or less, wherein a content of the solvent of one or more kinds selected from alcohols, ethers, esters, ketones, aromatic hydrocarbons and glycol ethers is 5 mass % or less.

According to a second invention, there is provided the near infrared absorbing fine particle dispersion liquid of the first invention, wherein the near infrared absorbing fine particle dispersion liquid further contains a dispersant which is soluble in the solvent of one or more kinds selected from the vegetable oils or the vegetable oil-derived compounds and has a fatty acid in its structure, and a concentration of the composite tungsten oxide in the near infrared absorbing fine particle dispersion liquid is 25 mass % or more and 75 mass % or less.

According to a third invention, there is provided the near infrared absorbing fine particle dispersion liquid of the second invention, wherein an anchor portion of the dispersant contains at least one of a secondary amino group, a tertiary amino group, and a quaternary ammonium group.

According to a fourth invention, there is provided the near infrared absorbing fine particle dispersion liquid of the third invention, wherein the dispersant has an acid value of 1 mg KOH/g or more.

According to a fifth invention, there is provided the near infrared absorbing fine particle dispersion liquid of any one of the first to fourth inventions, wherein a dispersed particle size of each near infrared absorbing fine particle is 1 nm or more and 200 nm or less.

According to a sixth invention, there is provided the near infrared absorbing fine particle dispersion liquid of any one of the first to fifth inventions, wherein the near infrared ray absorbing fine particles expressed by $M_xW_yO_z$ have a hexagonal crystal structure or composed of a hexagonal crystal structure.

According to a seventh invention, there is provided there is provided the near infrared absorbing fine particle dispersion liquid of any one of the first to sixth inventions, wherein a lattice constant of the near infrared absorbing fine particles expressed by $M_xW_yO_z$ is 0.74060 nm or more and 0.74082 nm or less on the a-axis and 0.76106 nm or more and 0.76149 nm or less on the c-axis.

According to an eighth invention, there is provided the near infrared absorbing fine particle dispersion liquid of any one of the first to seventh inventions, wherein a surface of each near infrared absorbing fine particle is coated with a compound of one kind or more selected from Si, Ti, Al and Zr.

According to a ninth invention, there is provided the near infrared absorbing fine particle dispersion liquid of any one of the first to eighth inventions, wherein the vegetable oil is one or more kinds selected from drying oils and semi-drying oils.

According to a tenth invention, there is provided a method for producing a near infrared absorbing fine particle dispersion liquid, including:

mixing Infrared absorbing fine particles into a solvent of one or more kinds selected from alcohols, ethers, esters, ketones, aromatic hydrocarbons, glycol ethers and having a boiling point of 180° C. or less, then dispersing the mixture in a medium mill, to thereby obtain a first dispersion liquid;

adding and mixing the solvent of one or more kinds selected from vegetable oils or vegetable oil-derived compounds into the first dispersion liquid, to thereby obtain a second dispersion liquid;

removing from the second dispersion liquid the solvent of one or more kinds selected from the alcohols, ethers, esters, ketones, aromatic hydrocarbons, and glycol ethers, until contents of the solvent of one or more kinds selected from alcohols, ethers, esters, ketones, aromatic hydrocarbons and glycol ethers, and the solvent having a boiling point of 180° C. or less is 5 mass % or less.

According to an eleventh invention, there is provided the method for producing a near infrared absorbing fine particle dispersion liquid of the tenth invention, wherein a concentration of the near infrared absorbing fine particles in the first dispersion liquid is 5 mass % or more and 50 mass % or less.

According to a twelfth invention, there is provided a method for producing a near infrared absorbing fine particle dispersion liquid, including:

mixing a solvent of one or more kinds selected from alcohols, ethers, esters, ketones, aromatic hydrocarbons and glycol ethers and having a boiling point of 180° C. or less and a solvent of one or more kinds selected from vegetable oils or vegetable oil-derived compounds, to thereby obtain a mixed solvent;

mixing infrared absorbing fine particles into the mixed solvent and dispersing the mixture in a wet medium mill, to thereby obtain a third dispersion liquid; and removing from the second dispersion liquid the solvent of one or more kinds selected from the alcohols, ethers, esters, ketones, aromatic hydrocarbons, and glycol ethers, until contents of the solvent of one or more kinds selected from alcohols, ethers, esters, ketones, aromatic hydrocarbons and glycol ethers, and the solvent having a boiling point of 180° C. or less is 5 mass % or less.

According to a thirteenth invention, there is provided the method for producing a near infrared absorbing fine particle dispersion liquid of the twelfth invention, wherein the concentration of the near infrared ray absorbing fine particles in the third dispersion liquid is 5 mass % or more and 50 mass % or less.

According to a fourteenth invention, there is provided the method for producing the near infrared absorbing fine particle dispersion liquid of any one of the tenth to thirteenth inventions, wherein a dispersant having a fatty acid soluble in the solvent in its structure is added to the solvent of one or more kinds selected from the vegetable oils or vegetable oil-derived compounds.

Advantage of the Invention

The near infrared absorbing fine particle dispersion liquid of the present invention can be easily applied to the offset printing having an absorption ability in the near infrared region and having a clear contrast.

DETAILED DESCRIPTION OF THE INVENTION

Figure 1:
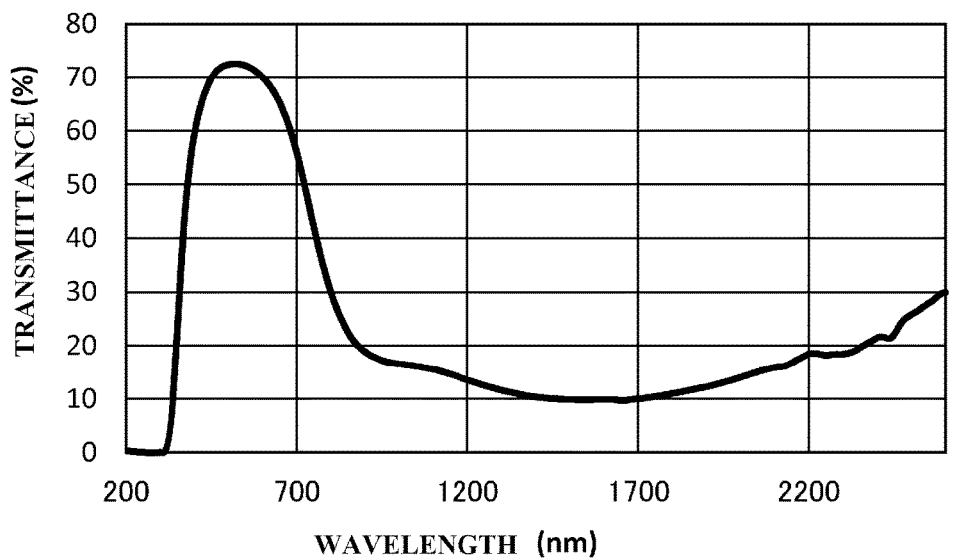
FIG. 1 is a light transmission profile of a dried film of a dispersion liquid B according to the present invention.

Embodiments of the present invention will be described in detail in an order of: near infrared absorbing fine particles, solvents (first solvent and second solvent), a dispersant, a method for dispersing the near infrared absorbing fine particles in the solvent (first solvent and second solvent), and a near infrared absorbing fine particle dispersion liquid.

1. Near Infrared Absorbing Fine Particles

The near infrared absorbing fine particles used in the present invention are one or more kinds selected from a composite tungsten oxide expressed by $M_xW_yO_z$ (M is an element of one or more kinds selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x/y \leq 1$, and $2.2 \leq z/y \leq 3.0$), or a tungsten oxide having a Magneli phase expressed by a general formula $W_yO_z$ (W is tungsten, O is oxygen, satisfying $2.45 \leq z/y \leq 2.999$).

Alkali metals are elements of Group 1 of a periodic table excluding hydrogen, alkaline earth metals are elements of Group 2 of the periodic table, rare earth elements are Sc, Y and lanthanoid elements.

In a case of the composite tungsten oxide expressed by $M_xW_yO_z$, element M is added in the near infrared absorbing fine particles used in the present invention. Therefore, free electrons are generated including a case of z/y=3.0, and an absorption property caused by free electrons are developed in a near infrared region, and such near infrared absorbing fine particles are effective as a near-infrared absorbing material in the vicinity of a wavelength of 1000 nm.

Particularly, from a viewpoint of improving optical properties and a weather resistance as a near infrared absorbing material, the element M is preferably one kind or more of Cs, Rb, K, Tl, In, Ba, Li, Ca, Sr, Fe and Sn, and the element M is further preferably Cs.

Further, in a case of $Cs_xW_yO_z$ ($0.25 \leq x/y \leq 0.35$, $2.2 \leq z/y \leq 3.0$), a lattice constant is preferably 0.74060 nm or more and 0.74082 nm or less on the a-axis and 0.76106 nm or more and 0.76149 nm or less on the c-axis. When the lattice constant is within the above range, near infrared absorbing fine particles having particularly excellent optical properties and weather resistance can be obtained. The lattice constant can be obtained by conducting Rietveld analysis based on the data of an XRD pattern, for example.

Further, it is also preferable that the composite tungsten oxide is treated with a silane coupling agent. This is because excellent dispersibility can be obtained and an excellent near infrared absorbing function and transparency in the visible light region can be obtained.

When the value of x/y indicating an added amount of the element M is larger than 0.001, a sufficient amount of free electrons is generated and a near-infrared absorption effect can be sufficiently obtained. As the added amount of the element M is increased, a supply amount of free electrons is increased and the near infrared absorption effect is also increased, but is saturated when the value of x/y is about 1. When the value of x/y is smaller than 1, formation of an impurity phase in a fine particle-containing layer can be avoided, which is preferable.

Next, the value of z/y indicating control of an oxygen amount is preferably $2.2 \leq z/y \leq 3.0$, and more preferably $2.45 \leq z/y \leq 3.0$, because even in the composite tungsten oxide expressed by $M_xW_yO_z$, the same mechanism works as the abovementioned tungsten oxide expressed by $W_yO_z$, and in addition, there is a supply of free electrons by adding the abovementioned element M even in a case of z/y=3.0.

There is a case that the composite tungsten oxide or a part of oxygen atoms constituting the composite tungsten oxide is replaced with a halogen atom, which is derived from the composite tungsten oxide of the present invention or a raw material compound used for producing the tungsten oxide. However, there is no problem in implementing the present invention. Therefore, the composite tungsten oxide and the tungsten oxide of the present invention include a case that part of the oxygen atom is replaced with a halogen atom.

Further, when each composite tungsten oxide fine particle which is a near infrared absorbing fine particle has a hexagonal crystal structure, transmission of the fine particles in the visible light region is improved and absorption in the near infrared region is improved.

When cations of the element M are added and present in hexagonal voids, the transmission in the visible light region is improved and the absorption in the near infrared region is improved. Generally, when the element M having a large ionic radius is added, the hexagonal crystal is formed, and specifically, when Cs, K, Rb, Tl, In, Ba, Sn, Li, Ca, Sr, and Fe are added, the hexagonal crystal is likely to be formed. Of course, It is preferable that the added element M is present in hexagonal voids formed by $WO_6$ units, and the added element is not limited to the abovementioned elements.

When the composite tungsten oxide fine particle having the hexagonal crystal structure have a uniform crystal structure, the added amount of the additional element M is preferably from 0.2 to 0.5, more preferably from 0.30 to 0.35, and ideally 0.33 in terms of x/y. When the value of x/y is 0.33, it is considered that the additional element M is arranged in all of the hexagonal voids.

Further, tetragonal, cubic tungsten bronze also has the near infrared absorption effect, other than the hexagonal crystal. Then, due to these crystal structures, an absorption position in the near infrared region is likely to change, and the absorption position is likely to move to a long wavelength side in an order of cubic<tetragonal<hexagonal crystals. Accordingly, absorption in the visible light region is small in an order of hexagonal<tetragonal<cubic crystals. Therefore, hexagonal tungsten bronze is preferably used for applications in which light in the visible light region is transmitted and light in the near infrared region is absorbed.

Next, in the tungsten oxide expressed as $W_yO_z$, the so-called "Magneli phase" having a composition ratio expressed by $2.45 \leq z/y \leq 2.999$ is chemically stable, and the absorption property in the near infrared region is good, and therefore such tungsten oxide is preferable as the near infrared absorbing material.

The near infrared absorbing fine particles of the present invention largely absorb a light in the near infrared region, particularly around the wavelength of 1000 nm, and therefore a transmission color tone is blue to green in many cases. Further, the dispersed particle size of each fine particle of the near infrared absorbing material can be selected depending on the intended use. First, when used for applications of maintaining transparency, each fine particle of the near infrared absorbing material preferably has a dispersed particle size of 2000 nm or less. This is because when the dispersed particle size is 2000 nm or less, a difference between the bottom of the transmittance and the bottom of the absorption in the near infrared region becomes large, and the effect as the near infrared absorbing material having transparency in the visible light region can be exhibited. Further, fine particles having a dispersed particle size smaller than 2000 nm do not completely shield a light by scattering, and visibility in the visible light region is maintained, and simultaneously, transparency can be maintained efficiently.

Further, when transparency is emphasized in the visible light region, preferably scattering of fine particles is taken into consideration. Specifically, the dispersed particle size of the near infrared absorbing fine particle is preferably 200 nm or less, and more preferably 100 nm or less. The reason is that scattering of light in the visible light region in a wavelength range of 400 nm to 780 nm due to geometric scattering or Mie scattering is reduced if the dispersed particle size is small, and as a result, it is possible to avoid a situation that the near infrared absorbing film becomes like a frosted glass and clear transparency cannot be obtained. Namely, when the dispersed particle size of the near infrared absorbing fine particle is 200 nm or less, the geometric scattering or the Mie scattering is reduced and the region becomes a Rayleigh scattering region. This is because in the Rayleigh scattering region, a scattered light is reduced in inverse proportion to the sixth power of the dispersed particle size, and therefore scattering is reduced as the dispersed particle size is decreased and the transparency is improved. Further, when the dispersed particle size is 100 nm or less, the scattered light is extremely reduced, which is preferable. From a viewpoint of avoiding scattering of light, it is preferable that the dispersed particle size is small. Meanwhile, when the dispersed particle size is 1 nm or more, industrial production is facilitated.

Further, the fact that the surface of the fine particle constituting the near infrared absorbing material of the present invention is covered with an oxide containing one or more kinds of Si, Ti, Zr and Al, is preferable from a viewpoint of improving the weather resistance of the near infrared absorbing material.

2. A Solvent (First Solvent)

The first solvent used in the present invention is a solvent suitable for pulverizing the near infrared absorbing material of the present invention into fine particles and dispersing it in the solvent. Specifically, it is preferable to use various organic solvents including alcohols such as ethanol, propanol, butanol, isopropyl alcohol, isobutyl alcohol and diacetone alcohol, ethers such as methyl ether, ethyl ether and propyl ether, esters, ketones such as acetone, methyl ethyl ketone, diethyl ketone, cyclohexanone, ethyl isobutyl ketone, methyl isobutyl ketone, aromatic hydrocarbons such as toluene, xylene and benzene, and glycol ethers such as propylene glycol monoethyl ether, which are compatible with a second solvent described later.

Among them, alcohols and glycol ethers are preferable solvents from a viewpoint of a low health hazard to a human body and safety and operability in the process. Further, methyl isobutyl ketone and toluene are preferable solvents from a viewpoint of excellent workability and improvement of productivity.

Specifically, it is considered that a low boiling point solvent is used as the first solvent, a difference in boiling point is provided between the first solvent and the second solvent, and the content of the first solvent is reduced by heating distillation.

It is considered preferable that the boiling point of the first solvent is 180° C. or less as long as solvent replacement is performed by heating distillation.

(Second Solvent)

The second solvent used in the present invention is required to be water-insoluble and not dissolve a rubber blanket used an offset printing. Specifically, a solvent composed of one or more kinds selected from vegetable oils and vegetable oil-derived compounds is used.

Examples of vegetable oils include drying oils such as linseed oil, sunflower oil and tung oil, semidrying oils such as sesame oil, cottonseed oil, rapeseed oil, soybean oil, rice bran oil, and non-drying oils such as olive oil, coconut oil, palm oil, dehydrated castor oil and the like. As the vegetable oil-derived compounds, fatty acid monoesters and ethers obtained by direct esterification of vegetable oil fatty acids and monoalcohols are used.

The abovementioned vegetable oils and vegetable oil-derived compounds have a double bond in the fatty acid of the fat which is a constituent component. The double bond reacts with oxygen in the air, whereby the polymerization reaction between the double bonds proceeds. A coating film after offset printing is solidified, through a bonding process by a polymerization reaction of molecules of oil or by a polymerization reaction of molecules of oil and pigment components for offset printing.

The solidification becomes faster as the double bonds are increased in the fatty acid, and the double bond in the fatty acid is evaluated by iodine value. Namely, the solidification of the vegetable oil and the vegetable oil-derived compounds is accelerated as the iodine value is increased. Specifically, the iodine value is 130 or more in the drying oil, 130 to 100 in the semidrying oil, and 100 or less in the non-drying oil. Then, one or more selected from semi-drying oil, drying oil such as linseed oil, sunflower oil, tung oil and the like having an iodine value of 130 or more, is preferable as the vegetable oil and the oil-derived compound used in the offset printing.

3. A Dispersant

The dispersant for dispersing the near infrared absorbing fine particles in the solvent is preferably one having a structure of a fatty acid. Further, the dispersant is required to be soluble in the solvent of the present invention described above.

Further, the structure of the dispersant is not particularly limited, and it is preferable to have a polylactone structure or hydroxystearic acid chain. Further, as a dispersant having one or more kinds selected from a secondary amino group, a tertiary amino group and a quaternary ammonium group as an anchor portion described later, an ability to disperse the infrared absorbing fine particles of the present invention in the solvent of the present invention is high, which is preferable.

Further, when the acid value of the dispersant of the present invention is 1 mg KOH/g or more, the ability to disperse the abovementioned infrared absorbing fine particles is high, which is preferable.

In the present invention, the anchor portion is a potion in a molecule constituting the dispersant and is a portion which adsorbs on the surface of the near infrared absorbing fine particle or a pigment.

Then, it is preferable to use a polymer dispersant having a basic anchor portion as the dispersant of the present invention. This is because by using particularly the polymer dispersant having the basic anchor portion, storage stability of an ink to be produced is improved, which is preferable.

Figure 5:
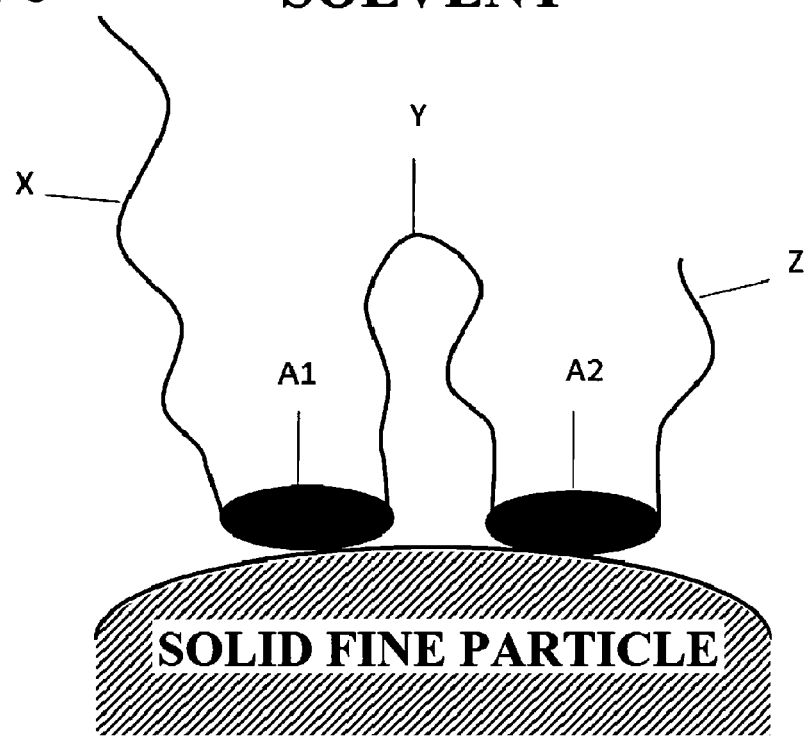
FIG. 5 is a schematic view of a dispersant according to the present invention.

An aspect of the polymer dispersant used in the present invention is shown in FIG. 5. As shown in FIG. 5, in the general formula [X-A1-Y-A 2-Z], A1 and A2 are portions (anchor portions) which are adsorbed on solid fine particles such as the near infrared absorbing fine particles and the pigment. In the anchor portion, its structure is not particularly limited as long as it has at least one point (adsorption point) to be adsorbed on each solid fine particle, and has a chain, cyclic, or fused polycyclic shape, or a combination thereof for example. Further, A1 and A2 may be the same or different. On the other hand, X, Y and Z are polymer chain portions which are solivated, and solved and spread out from the surface of the solid fine particle into a liquid, and hereinafter, X and Z are referred to as tail portions and Y is referred to as a loop portion. In the tail portions and the loop portion, a homopolymer composed of a single monomer and a copolymer composed of plural monomers are used.

Further, as the polymer dispersant used in the present invention, a substance having no loop portion (Y) in the general formula [X-A1-Y-A2-Z], can be used, which is synonymous with the general formula [X-A1-A2-Z].

Figure 6:
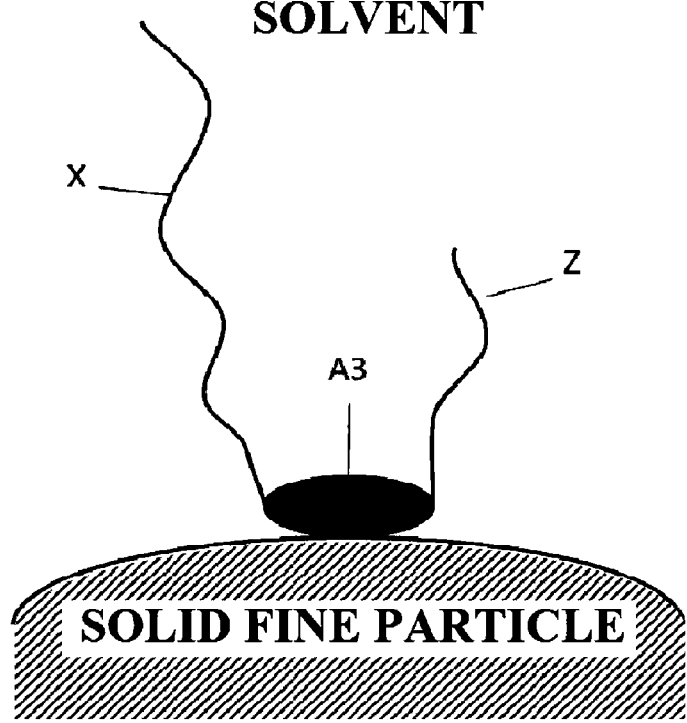
FIG. 6 is schematic view of a dispersant according to different aspect of the present invention.

Still further, as an aspect of the polymer dispersant used in the present invention, there is also a structure in which the loop portion Y shown in FIG. 6 does not exist and two tail portions are bonded to one anchor portion (A3). In this case, the general formula is [X-A3-Z].

Figure 7:
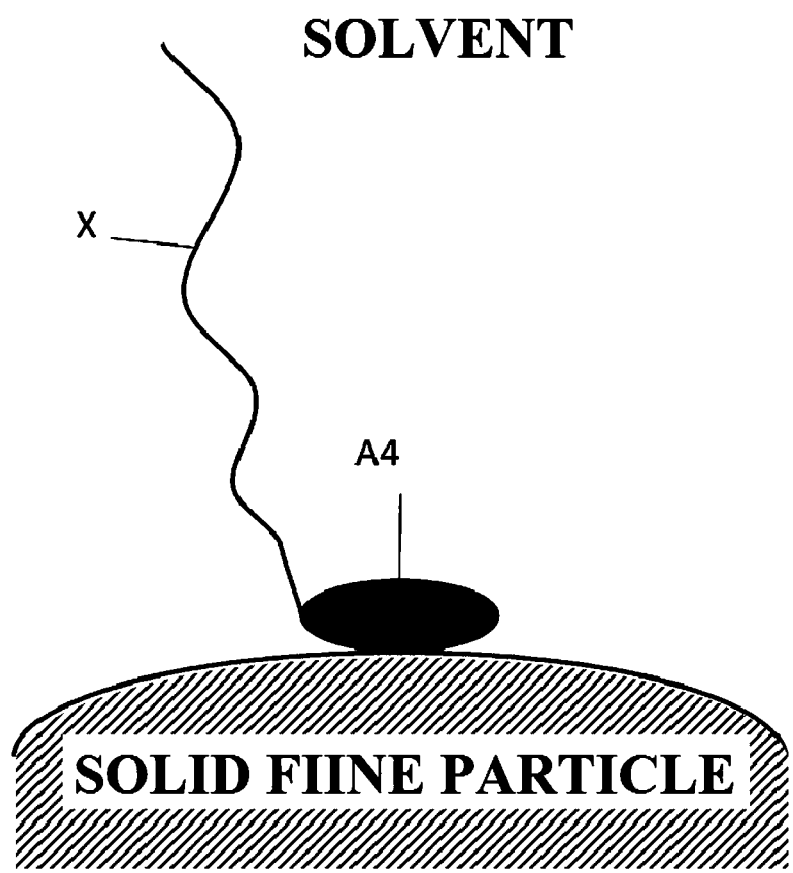
FIG. 7 is a schematic view of a dispersant according to still another aspect of the present invention.

In addition, as an aspect of the dispersant of the present invention, it is also possible to use the dispersant having no tail portion (Z) and having one tail portion (X) bonded to one anchor portion (A4) as shown in FIG. 7. In this case, the general formula is [X-A4].

A 1, A 2, A 3, A 4 constituting the dispersant according to the present invention, have at least one functional group (adsorption point) that exerts adsorption interaction with the surface of the solid fine particle by hydrogen bonding, acid/base interaction, or the like. Further, as described above, A1 and A2 may be the same as each other or may be different from each other, A1 and A2 having the same functional group as the functional group (adsorption point) that exerts adsorption interaction are preferable, in consideration of the adsorptivity of the solid fine particles to the surface. Further, it is preferable that A1 and A2 are the same from a viewpoint of the ease of producing the polymer dispersant.

The molecular chains X, Y and Z constituting the dispersant of the present invention may be composed of different chemical species and at least two of them may be composed of the same chemical species. The tail portion (X, Z) and the loop portion (Y) of the molecular chain are portions which are solvated and spread from the surface of the solid fine particle to be dissolved in the solvent, and therefore a molecular chain having an affinity with the solvent is used.

The dispersant of the present invention exhibits a dispersion ability enabling the viscosity of the dispersion liquid to be maintained at 180 mPa/S or less, when 10 mass % or more and 25 mass % or less of the composite tungsten oxide and/or tungsten oxide of the present invention are added to the solvent composed of one or more petroleum solvents, which is then mechanically dispersed to obtain a dispersion liquid.

The reason is as follows. As a result of maintaining the viscosity of the dispersion at 180 mPa/S or less, pulverization and dispersion proceed sufficiently in the composite tungsten oxide fine particles and/or the tungsten oxide. Then, in the produced near infrared absorbing fine particle dispersion liquid, the dispersed particle size of the composite tungsten oxide and/or the tungsten oxide can be made 200 nm or less.

Specific examples of preferable dispersants include commercially available dispersants such as: DISPERBYK 142; Disperbyk 160, Disperbyk 161, Disperbyk 162, Disperbyk 163, Disperbyk 166, Disperbyk 170, Disperbyk 180, Disperbyk 182, Disperbyk 184, Disperbyk 190, Disperbyk 2155 (All manufactured by BYK Japan K.K.); EFKA-46, EFKA-47, EFKA-48, EFKA-49 (all manufactured by BASF); Polymer 100, polymer 120, polymer 150, polymer 400, polymer 401, polymer 402, polymer 403, polymer 450, polymer 451, polymer 452, polymer 453 (all manufactured by EFKA Chemical Co.); SOLSPERSE 11200, Solsperse 13940, Solsperse 16000, Solsperse 17000, Solsperse 18000, Solsperse 20000, Solsperse 24000, Solsperse 27000, Solsperse 28000, Solsperse 32000, Solsperse 33000, Solsperse 39000, Solsperse 56000, Solsperse 71000 (all manufactured by Lubrizol Japan Ltd.); Solplus D 530, Solplus DP 320, Solplus L 300, Solplus K 500, Solplus R 700 (all manufactured by Lubrizol Japan Ltd.); Ajisper PB 711, Ajisper PA 111, Ajisper PB 811, Ajisper PW 911 (all manufactured by Ajinomoto Co., Ltd.); and Floren DOPA-15, Floren DOPA-22, Floren DOPA-17, Floren TG-730 W, Floren G-700, Floren TG-720 W (all manufactured by Kyoeisha Chemical Industry Co., Ltd.).

The addition amount of the dispersant of the present invention is preferably 30 parts by weight or more and 200 parts by weight or less based on 100 parts by weight of the near infrared absorbing fine particles.

Further, in a case of using a commercially available dispersant, it is preferable that the dispersant does not contain a solvent that may dissolve acrylic resin or the like. Accordingly, a nonvolatile content (after heating at 180° C. for 20 minutes) of the dispersant is preferably high, for example, preferably 95% or more.

4. Method for Dispersing the Near Infrared Absorbing Fine Particles in the Solvent The abovementioned second solvent has a high viscosity, and therefore it is difficult to disperse the near-infrared absorbing fine particles in the second solvent. Particularly, it is difficult to use a solvent such as tung oil having a viscosity (24° C.) of 180 mPa/S or more.

Therefore, the method for dispersing the near infrared absorbing fine particles in the solvent includes:

(1) a method for producing a first near infrared absorbing fine particle dispersion liquid, including:

first, mixing Infrared absorbing fine particles into the first solvent and dispersed in a wet medium mill, to thereby obtain a first dispersion liquid;

adding a solvent of one or more kinds selected from vegetable oils or vegetable oil-derived compounds to the first dispersion liquid and mixing them, to thereby obtain a second dispersion liquid; and removing the first solvent from the second dispersion liquid until a content of the first solvent is 5 mass % or less.

(2) a method for producing a second near infrared absorbing fine particle dispersion liquid, including:

first, mixing the first solvent and the second solvent, to thereby obtain a mixed solvent;

mixing the near infrared absorbing fine particles in the mixed solvent and dispersing the mixture in a wet medium mill, to thereby obtain a third dispersion liquid; and removing the first solvent of the preceding period from the third dispersion liquid until the content of the first solvent is 5 mass % or less.

Explanation will be given hereafter in an order of (1) a method for producing a first near infrared absorbing fine particle dispersion liquid and (2) a method for producing a second near infrared absorbing fine particle dispersion liquid.

(1) A Method for Producing the First Near Infrared Absorbing Fine Particle Dispersion Liquid A dispersing method for obtaining the first dispersion liquid by dispersing the near infrared absorbing fine particles of the present invention in the solvent of at one kind or more, is not particularly limited as long as it is a method in which the fine particles are uniformly dispersed in the solvent. Specifically, it is preferable to use a wet type medium mill such as a bead mill or a ball mill. The first solvent is a solvent having a boiling point of 180° C. or less, preferably a boiling point of 150° C. or less.

When the concentration of the near infrared absorbing fine particles in the first dispersion liquid is 5 mass % or more, productivity is excellent when manufacturing an offset printing ink composition. On the other hand, when the concentration of the near infrared absorbing fine particles is 50 mass % or less, the viscosity of the first dispersion liquid is not increased, and it is easy to pulverize and disperse the near-infrared absorbing fine particles.

From the above viewpoint, the concentration of the near infrared absorbing fine particles in the first dispersion liquid is preferably from 5 to 50 mass %, more preferably from 10 to 40 mass %, further preferably from 20 to 30 mass %.

The second solvent of one or more kinds selected from the vegetable oils or the vegetable oil-derived compounds is added and mixed into the first dispersion liquid, to thereby obtain a second dispersion liquid. At this time, it is preferable to select the solvent which is compatible with each other as the first solvent and the second solvent.

In the mixture of the first dispersant and the second dispersant, when the second solvent is 2.5 parts by weight or more based on 100 parts by weight of the near infrared absorbing fine particles contained in the first dispersion liquid, the finally obtained fluidity of the near infrared absorbing fine particle dispersion liquid of the present invention is kept, recovery is easy, and productivity is maintained.

In contrast, when the amount of the second solvent is 270 parts by weight or less based on 100 parts by weight of the near infrared absorbing fine particles contained in the first dispersion liquid, the concentration of the finally obtained Infrared absorbing fine particles in the near infrared absorbing fine particle dispersion liquid of the present invention, is guaranteed. Therefore, it is possible to avoid adding a large amount of the near infrared absorbing fine particle dispersion liquid of the present invention, and the viscosity of the ink can be guaranteed. As a result, it is unnecessary to adjust the viscosity, thus simplifying the process and an increase of a production cost can be avoided, which is preferable.

From the abovementioned viewpoint, the mixing ratio of the first dispersion liquid and the second solvent is preferably 2.5 to 270 parts by weight, preferably 70 to 270 parts by weight, more preferably 92 to 204 parts by weight of the second solvent based on 100 parts by weight of the near infrared absorbing fine particles contained in the first dispersion liquid.

As described above, when it is desired to further suppress the increase in the viscosity of the first and second dispersions in dispersing the near infrared absorbing fine particles in the solvent of one of more kinds to thereby obtain the first near infrared absorbing fine particle dispersion liquid, and adding and mixing the second solvent of one or more kinds thereinto to thereby obtain the second dispersion liquid, it is also a preferable configuration to add the abovementioned dispersant. As a method for adding the dispersant, it is preferable to (i) add the dispersant into the first solvent, (ii) previously add the dispersant into the second solvent to prepare a dispersant solution, and add the dispersant solution into the first dispersion, (iii) add the dispersant into the first dispersion liquid in parallel with addition of the second solvent, and the like. When the method of adding the dispersant into the first solvent is used, a dispersant soluble in the first solvent is selected.

The first solvent is removed from the second dispersion liquid, and the content of the first solvent in the second dispersion liquid is set to 5 mass % or less, to thereby obtain the near infrared absorbing fine particle dispersion liquid of the present invention.

For removing the first solvent from the second dispersion liquid, a heat distillation method using a difference in boiling points of both solvents can be used. Further, a reduced pressure heating distillation with a reduced pressure operation is also a preferable configuration from a viewpoint of safety, energy cost, and stabilization of quality.

(2) Method for Producing the Second Near Infrared Absorbing Fine Particle Dispersion Liquid The first solvent of one or more kinds and the second solvent of one or more kinds are previously mixed to obtain a mixed solvent. At this time, it is preferable to select the solvent which is soluble each other as the first solvent and the second solvent.

The dispersion method for dispersing the near infrared absorbing fine particles of the present invention in the mixed solvent to thereby obtain a third dispersion liquid, can be arbitrarily selected as long as it is the method for uniformly dispersing the fine particles in the solvent. Specifically, it is preferable to use a wet medium mill such as a bead mill or a ball mill.

When the concentration of the near infrared absorbing fine particles in the third dispersion is 5 mass % or more, the productivity in producing an offset printing ink composition is excellent. On the other hand, when the concentration of the near infrared absorbing fine particles is 50 mass % or less, the viscosity of the third dispersion liquid is not increased, and it is easy to pulverize and disperse the near infrared absorbing fine particles.

From this viewpoint, the concentration of the near infrared absorbing fine particles in the third dispersion liquid is preferably from 5 to 50 mass %, more preferably from 10 to 40 mass %, still more preferably from 20 to 30 mass %.

When it is desired to further suppress the increase in the viscosity of the mixed solvent into which the near infrared absorbing fine particles are added as described above, it is also a preferable configuration to add the abovementioned dispersant. As a method of adding the dispersant, it may be added into the mixed solvent before the dispersion operation.

Next, the first solvent is removed from the mixed solvent in which the near infrared absorbing fine particles are dispersed, and the first solvent content in the mixed solvent in which the near infrared absorbing fine particles are dispersed is set to 5 mass % or less, to thereby obtain the near infrared absorbing fine particle dispersion liquid of the present invention.

In removing the first solvent from the mixed solvent in which the near infrared absorbing fine particles are dispersed, it is preferable to use a heat distillation method using a difference in boiling point between the first and second solvents.

Specifically, in the heat distillation method including the depressurization operation, the second dispersion liquid is distilled under reduced pressure while stirring, and the first solvent is separated from the second dispersion liquid. As a vacuum stirring type dryers can be cited as a device used for heat distillation including the reduced pressure operation, but there is no particular limitation as long as it is a device having the above function. The temperature during the heat distillation is preferably from 35 to 200° C., and more preferably from 40 to 150° C., particularly preferably from 60° C. to 120° C. If the temperature during hot distillation is 35° C. or more, the solvent removal rate can be guaranteed. On the other hand, when the temperature is 200° C. or less, it is possible to avoid a situation in which the dispersant is deteriorated.

When the abovementioned heating distillation is combined with a depressurizing operation, the degree of vacuum is −0.05 MPa or less at gauge pressure, more preferably −0.06 MPa or less. When the gauge pressure is −0.05 MPa or less, the removal rate of the solvent is fast and the productivity is good.

By using the pressure distillation method, a solvent removal efficiency is improved and the near infrared absorbing fine particle dispersion liquid of the present invention is not exposed to a high temperature for a long time, and therefore it is preferable because there is no occurrence of an aggregation of the dispersed near infrared absorbing fine particles and deterioration of the second solvent. Further productivity is also increased, and it is easy to recover evaporated organic solvent, which is preferable from a viewpoint of environmental consideration.

5. Near Infrared Absorbing Fine Particle Dispersion Liquid

By the production method described above, the near infrared absorbing fine particle dispersion liquid of the present invention is obtained.

The higher the concentration of the near infrared absorbing fine particles is in the near infrared absorbing fine particle dispersion liquid of the present invention, the easier it is to prepare the ink for the offset printing, which is preferable. On the other hand, the higher the concentration of the near infrared absorbing fine particles is, the lower the fluidity of the near infrared absorbing fine particle dispersion liquid is, but in the abovementioned production method, it is sufficient if the fluidity is such that the produced near infrared absorbing fine particle dispersion liquid can be recovered.

From this viewpoint, in the near infrared absorbing fine particle dispersion liquid of the present invention, the preferable concentration of the near infrared absorbing fine particles is 25 mass % or more and 75 mass % or less, more preferably 25 mass % or more and 50 mass % or less, further preferably 30 mass % or more and 45 mass % or less.

On the other hand, the dispersed particle size of each near infrared ray absorbing fine particle can be arbitrarily controlled by the treatment time of the wet medium mill. By increasing the treatment time, it is possible to reduce the size of dispersed particle.

A lower limit of the viscosity of the near infrared absorbing fine particle dispersion liquid of the present invention depends on the viscosity of the vegetable oils or the vegetable oil-derived compounds to be used. For example, the viscosity (24° C.) of sunflower oil is 50 mPa/S, the viscosity of linseed oil (24° C.) is 40 mPa/S, and the viscosity of tung oil (24° C.) is 210 mPa/S.

EXAMPLE

Hereinafter, the present invention will be specifically described with reference to examples, but the present invention is not limited to these examples.

The acid value of the dispersant of this example is measured by a potentiometric titration method in accordance with JIS K 0070.

The method of measuring the viscosity of the near infrared absorbing fine particle dispersion liquid of this example was measured using a vibration type viscometer VM 100 A-L (manufactured by CBC Materials Co., Ltd.).

On the other hand, the optical properties of the near infrared absorbing film of this example were measured using a spectrophotometer U-4000 (manufactured by Hitachi, Ltd.) in accordance with JIS R 3106.

Example 1

23 mass % of hexagonal $Cs_{0.33}WO_3$ (a-axis: 0.74077 nm, c-axis: 0.76128 nm) which is a composite tungsten oxide as near infrared absorbing fine particles, and 11.5 mass % of a dispersant having a fatty acid and an amino group in its structure, having an acid value of 20.3 mg KOH/g, having a hydroxystearic acid chain, and having a nonvolatile content of 100% (hereinafter abbreviated as dispersant "a"), and 65.5 mass % of Methyl isobutyl ketone (abbreviated as MIBK hereafter) as a solvent, were weighed.

These near infrared ray absorbing fine particles, dispersing agent and solvent were charged in a paint shaker containing 0.3 mmφ $ZrO_2$ beads, pulverized and dispersed for 10 hours, to thereby obtain an infrared absorbing fine particle dispersion liquid (abbreviated as a dispersion liquid A hereafter) of example 1.

Further, 42.2 parts by weight of tung oil was added into 100 parts by weight of the liquid A, and the mixture was subjected to a heating distillation at 80° C. for 1 hour with a stirring type vacuum drier (Universal Mixer manufactured by Tsukishima) including a pressure reduction operation (gauge pressure of −0.08 MPa), and MIBK was removed to thereby obtain a composite tungsten oxide fine particle dispersion liquid (abbreviated as a dispersion liquid B hereafter).

Here, the residual MIBK amount of the dispersion liquid B was measured by a dry type moisture meter, and it was found to be 1.15 mass %. The dispersed particle size of each tungsten oxide fine particles in the dispersion liquid B was measured with a particle size distribution meter manufactured by Otsuka Electronics Co., and it was found to be 81 nm.

The results are shown in table 1 (also shown in examples 2, 3, 4 and comparative examples 1 and 2).

A transparent PET film having a thickness of 50 μm was prepared as a substrate to be printed, and a dispersion liquid B was applied to the surface thereof with a bar coater to a thickness of 8 μm. This film was dried at 70° C. for 3 hours to thereby dry the dispersion liquid B.

The visible light transmittance of the obtained dried film of the dispersion liquid B was 71.3%. Further, the transmittance of a light having a wavelength of 550 nm which was a visible light region was 72.2%, the transmittance of a light having a wavelength of 800 nm was 30.0%, the transmittance of a light having a wavelength of 900 nm was 18.8%, the transmittance of a light having a wavelength of 1000 nm was 16.6%, and the transmittance of a light having a wavelength of 1500 nm was 9.9% in a near infrared region. The light transmission profile of the dried film of this dispersion liquid B is shown in FIG. 1, and measurement results are shown in table 1 (examples 2, 3, 4 are similarly shown hereafter).

Example 2

In the same manner as in example 1 except that 11.5 parts by weight of tung oil was added into 100 parts by weight of liquid A, a near infrared absorbing fine particle dispersion liquid of example 2 (abbreviated as a dispersion liquid C hereafter) was obtained.

The residual MIBK amount of the dispersion liquid C was measured with a dry moisture meter, and it was found to be 2.10 mass %. The dispersed particle size of each tungsten oxide fine particle in the dispersion liquid C was measured with a particle size distribution meter manufactured by Otsuka Electronics Co., and it was found to be 77 nm.

Next, in the same manner as in example 1, a dried film of example 2 was obtained and the optical properties were measured.

Figure 2:
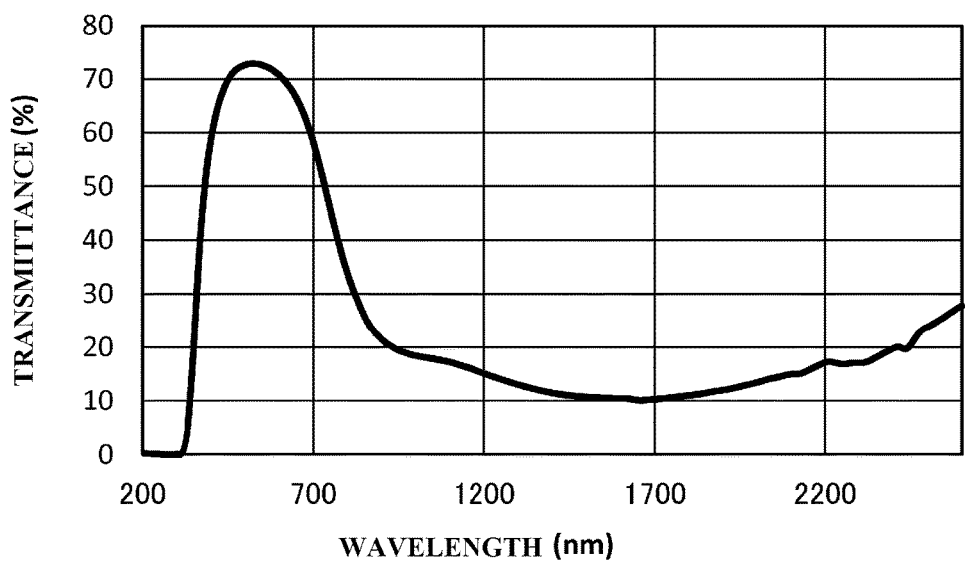
FIG. 2 is a light transmission profile of a dried film of a dispersion liquid C according to the present invention.

The obtained dried film had a visible light transmittance of 71.7%. Further, the transmittance at 550 nm in the visible light region was 72.6, the transmittance at 800 nm was 33.9%, the transmittance at 900 nm was 21.5%, the transmittance at 1000 nm was 18.4%, and the transmittance at 1500 nm was 10.7% in the near infrared region. The transmission profile of the dried film of this dispersion liquid C is shown in FIG. 2.

Example 3

In the same manner as in example 1 except that 42.2 parts by weight of linseed oil was added and mixed into 100 parts by weight of liquid A, a near-infrared absorbing fine particle dispersion liquid (abbreviated as a dispersion liquid D hereafter) of example 3 was obtained.

An amount of residual MIBK of the dispersion liquid D was measured with a dry moisture meter, and it was found to be 1.7 mass %. The dispersed particle size of each tungsten oxide fine particle in the dispersion liquid D was measured with a particle size distribution meter manufactured by Otsuka Electronics Co., and it was found to be 79 nm.

Next, a dried film of example 3 was obtained in the same manner as in example 1, and optical properties were measured.

Figure 3:
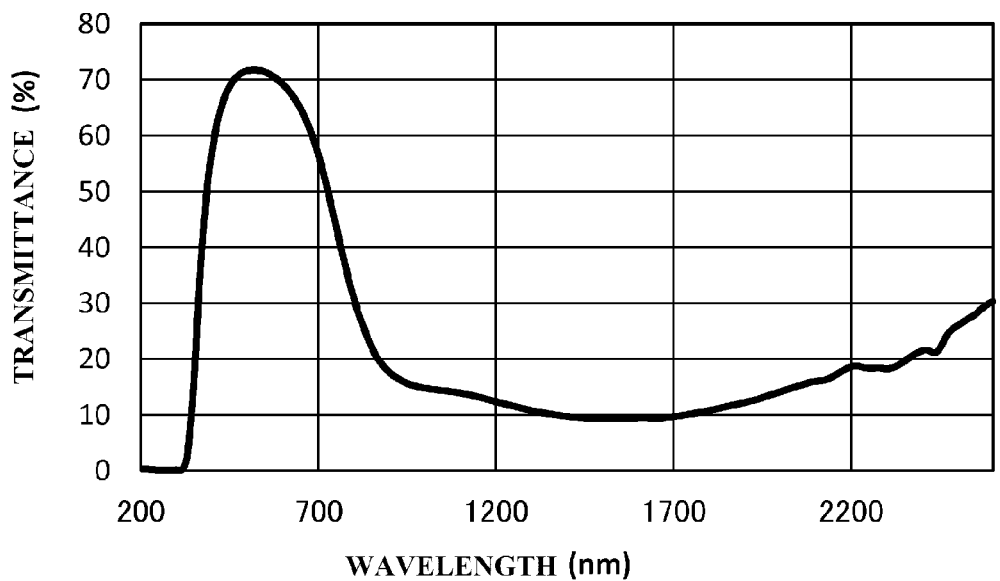
FIG. 3 is a light transmission profile of a dried film of a dispersion liquid D according to the present invention.

The obtained dried film had a visible light transmittance of 70.5%. Further, the transmittance at 550 nm in the visible light region was 71.3, the transmittance at 800 nm was 30.8%, the transmittance at 900 nm was 17.6%, the transmittance at 1000 nm was 14.7%, and the transmittance at 1500 nm was 9.3% in the near infrared region. The transmission profile of the dried film of this dispersion liquid D is shown in FIG. 3.

Example 4

In the same manner as in example 1 except that 23 mass % of hexagonal $Cs_{0.33}WO_3$ which is the same composite tungsten oxide as in example 1, 11.5 mass % of dispersant "a" as a dispersant, 65.5 mass % of propylene glycol monomethyl ether acetate (abbreviated as PGM-Ac hereafter) as a solvent were weighed, to thereby obtain the near infrared absorbing fine particle dispersion liquid (abbreviated as a dispersion liquid E hereafter) of example 4.

Next, in the same manner as in example 1 except that the dispersion liquid E was used, a composite tungsten oxide fine particle dispersion liquid (abbreviated as a dispersion liquid F hereafter) of example 4 was obtained.

The residual PGM-Ac amount of the dispersion liquid F was measured with a dry moisture meter, and it was found to be 4.20 mass %. The dispersed particle size of each tungsten oxide fine particle in the dispersion liquid F was measured with a particle size distribution meter manufactured by Otsuka Electronics Co., and it was found to be 82 nm.

Next, in the same manner as in example 1, a dried film was obtained and the optical properties were measured.

Figure 4:
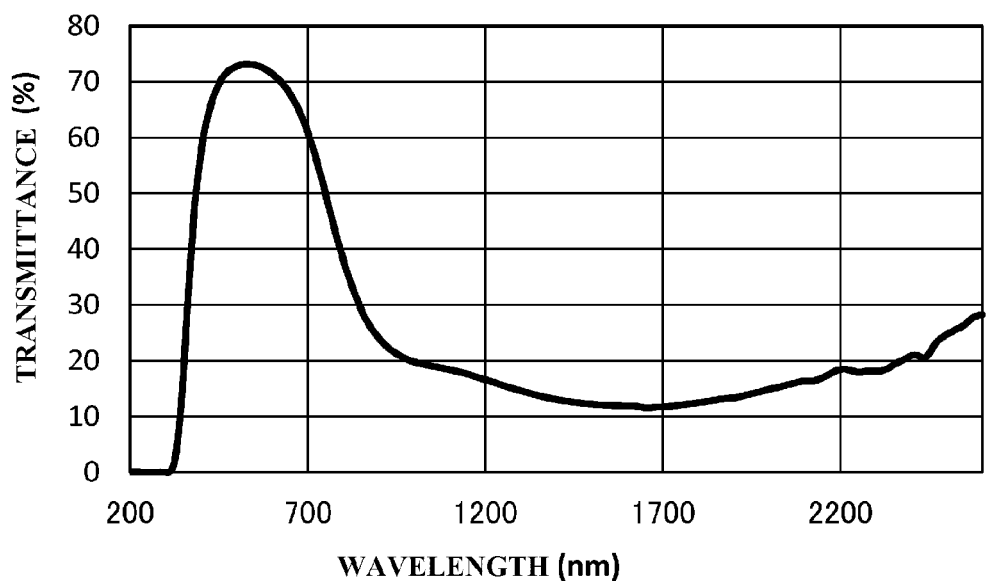
FIG. 4 is a light transmission profile of a dried film of a dispersion liquid F according to the present invention.

The obtained dried film had a visible light transmittance of 72.2%. Further, the transmittance at 550 nm in the visible light region was 73.0, the transmittance at 800 nm was 38.2%, the transmittance at 900 nm was 24.1%, the transmittance at 1000 nm was 19.8%, and the transmittance at 1500 nm was 12.2% in the near infrared region. The transmission profile of the dried film of this dispersion liquid F is shown in FIG. 4.

Comparative Example 1

As the near infrared absorbing fine particles, 23 mass % of hexagonal $Cs_{0.33}WO_3$ which is the same composite tungsten oxide as in example 1, 11.5 mass % of dispersant "a" as a dispersant, and 65.5 mass % of ethylene glycol (abbreviated as E.G. hereafter) having a boiling point of 197° C. as a solvent, were weighed.

In the same manner as in example 1 except that these near infrared absorbing fine particles, dispersant, and solvent were charged in a paint shaker containing 0.3 mmφ $ZrO_2$ beads, pulverized and dispersed for 10 hours to thereby obtain the near infrared absorbing fine particle dispersion liquid (abbreviated as a dispersion liquid G hereafter) of comparative example 1, a composite tungsten oxide fine particle dispersion liquid (abbreviated as a dispersion liquid H hereafter) of comparative example 1 was obtained.

Residual E.G. amount in the dispersion liquid H was measured, and it was found to be 34.21 mass %.

The dispersed particle size of each tungsten oxide fine particle in the dispersion liquid H was measured with a particle size distribution meter manufactured by Otsuka Electronics Co., and it was found to be 71 nm.

Next, a dried film of comparative example 1 was produced in the same manner as in example 1 except that the dispersion liquid H was used. However, there are large content of E.G., and therefore the dried film could not be obtained, and the optical properties could not be measured.

Comparative Example 2

As the near infrared absorbing fine particles, 23 mass % of hexagonal $Cs_{0.33}WO_3$ which is the same composite tungsten oxide as in example 1, 11.5 mass % of dispersant "a" as a dispersant, and 65.5 mass % of tung oil as a solvent were weighed.

These near infrared ray absorbing fine particles, dispersing agent, and solvent were charged in a paint shaker containing 0.3 mmφ $ZrO_2$ beads and pulverized and dispersed for 40 hours. However, the viscosity was high, and therefore pulverizability was poor and the near infrared absorbing fine particle dispersion liquid could not be obtained.

Evaluation of Examples 1 to 4

In examples 1 to 4, the content of the first solvent in the second dispersion liquid in which fine particles of tungsten oxide or composite tungsten oxide were dispersed in the vegetable oil, was less than 5 mass % in each case.

Further, the dried films of examples 1 to 4 exhibit high transmittance in the visible light region and remarkably low transmittance in the near infrared region.

From this result, it is presumed that the printing pattern of the offset printing ink prepared using the near infrared absorbing fine particle dispersion liquid of the present invention and other ink material can be discriminated by the near infrared ray identifying machine.

TABLE 1

| | Raw Material | | | | | | | Properties of dispersed liquid | | Optical properties | | | | | |
|---|---|---|---|---|---|---|---|---|---|---|---|---|---|---|---|
| | CWO | | Dispersant | | | | | Residual amount of first solvent (Mass %) | CWO dispersed particle size (nm) | Visible light transmittance (%) | Transmittance in each wavelength | | | | |
| | First Solvent | content | | Acid | Content | | | | | | 550 nm (%) | 800 nm (%) | 900 nm (%) | 1000 nm (%) | 1500 nm (%) |
| | Kind | (Mass %) | (Mass %) | Kind | value (mgKOH/g) | (Mass %) | Second solvent | A* | | | | | | | |
| Example 1 | MIBK | 65.5 | 23 | a | 20.3 | 11.5 | Tung oil 42.2 B* | B | 1.15 | 81 | 71.3 | 72.2 | 30.0 | 18.8 | 16.6 | 9.9 |
| | Dispersion liquid A: 100 parts by weight | | | | | | | | | | | | | | |
| Example 2 | MIBK | 65.5 | 23 | a | 20.3 | 11.5 | Tung oil 11.5 B* | C | 2.10 | 77 | 71.7 | 72.6 | 33.9 | 21.5 | 18.4 | 10.7 |
| | Dispersion liquid A: 100 parts by weight | | | | | | | | | | | | | | |
| Example 3 | MIBK | 65.5 | 23 | a | 20.3 | 11.5 | E* 42.2 B* | D | 1.70 | 79 | 70.5 | 71.3 | 30.8 | 17.6 | 14.7 | 9.3 |
| | Dispersion liquid A: 100 parts by weight | | | | | | | | | | | | | | |
| Example 4 | PGM-Ac | 65.5 | 23 | a | 20.3 | 11.5 | Tung oil 42.2 B* | F | 4.20 | 82 | 72.2 | 73.0 | 38.2 | 24.1 | 19.8 | 12.2 |
| | Dispersion liquid E: 100 parts by weight | | | | | | | | | | | | | | |
| D*1 | E.G. | 65.5 | 23 | a | 20.3 | 11.5 | Tung oil 42.2 B* | H | 34.21 | 71 | — | — | — | — | — | — |
| | Dispersion liquid G: 100 parts by weight | | | | | | | | | | | | | | |
| D*2 | Tung oil | 65.5 | 23 | a | 20.3 | 11.5 | — | — | — | — | — | — | — | — | — | — |
| | Dispersion liquid was not obtained | | | | | | | | | | | | | | |

CWO: Composite tungsten oxide particle
Dispersion liquid "a"; dispersant having hydroxystearic acids, and having nonvolatile content 100%
A* = Sample name of dispersion liquid
B* = parts by weight
C* = Linseed oil
D* = Comparative example

The invention claimed is:

1. A near infrared absorbing fine particle dispersion liquid, comprising:
   a first solvent comprising at least one solvent selected from the group consisting of alcohols, ethers, esters, ketones, aromatic hydrocarbons, and glycol ethers, and having a boiling point of 180° C. or less;
   a second solvent comprising at least one solvent selected from the group consisting of vegetable oils and vegetable oil-derived compounds;
   near infrared absorbing fine particles selected from the group consisting of: fine particles of a composite tungsten oxide expressed by $M_xW_yO_z$ in which M is at least one element selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I,
   W is tungsten,
   O is oxygen, and
   $0.001 \leq x/y \leq 1$ and $2.2 \leq z/y \leq 3.0$, and
   fine particles of a tungsten oxide having a Magneli phase and expressed by a general formula $W_yO_z$ in which W is tungsten,
   O is oxygen, and
   $2.45 \leq z/y \leq 2.999$;
   wherein: a residual content of the first solvent in the near infrared absorbing fine particle dispersion liquid 1.15 mass % or more and 4.20 mass % or less, and a content of the near Infrared absorbing fine particles in the near infrared absorbing fine particle dispersion liquid is 25 mass % or more and 75 mass % or less.

2. The near infrared absorbing fine particle dispersion liquid according to claim 1, further comprising:
   a dispersant which is soluble in the second solvent and has a fatty acid in its structure,
   wherein a content of the fine particles of the composite tungsten oxide in the near infrared absorbing fine particle dispersion liquid is 25 mass % or more and 75 mass % or less.

3. The near infrared absorbing fine particle dispersion liquid according to claim 2, wherein an anchor portion of the dispersant contains at least one selected from the group consisting of a secondary amino group, a tertiary amino group, and a quaternary ammonium group.

4. The near infrared absorbing fine particle dispersion liquid according to claim 2, wherein the dispersant has an acid value of 1 mg KOH/g or more.

5. The near infrared absorbing fine particle dispersion liquid according to claim 1, wherein a dispersed particle size of each near infrared absorbing fine particle is 1 nm or more and 200 nm or less.

6. The near infrared absorbing fine particle dispersion liquid according to claim 1, comprising the fine particles of a composite tungsten oxide, wherein the fine particles of the composite tungsten oxide have a hexagonal crystal structure or are composed of a hexagonal crystal structure.

7. The near infrared absorbing fine particle dispersion liquid according to claim 1, comprising the fine particles of a composite tungsten oxide, wherein a lattice constant of the fine particles of the composite tungsten oxide is 0.74060 nm or more and 0.74082 nm or less on the a-axis and 0.76106 nm or more and 0.76149 nm or less on the c-axis.

8. The near infrared absorbing fine particle dispersion liquid according to claim 1, wherein a surface of each near infrared absorbing fine particle is coated with a compound of at least one element selected from the group consisting of Si, Ti, Al and Zr.

9. The near infrared absorbing fine particle dispersion liquid according to claim 1, wherein the second solvent comprises at least one vegetable oil selected from the group consisting of drying oils and semi-drying oils.

10. The near infrared absorbing fine particle dispersion liquid according to claim 1, wherein the near infrared absorbing fine particle dispersion liquid is an offset printing ink.

11. A method for producing a near infrared absorbing fine particle dispersion liquid, comprising:
mixing near Infrared absorbing fine particles selected from the group consisting of: fine particles of a composite tungsten oxide expressed by $M_xW_yO_z$ in which M is at least one element selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I,
W is tungsten,
O is oxygen, and
$0.001 \leq x/y \leq 1$ and $2.2 \leq z/y \leq 3.0$, and
fine particles of a tungsten oxide having a Magneli phase and expressed by a general formula $W_yO_z$ in which
W is tungsten,
O is oxygen, and
$2.45 \leq z/y \leq 2.999$,
into a first solvent comprising at least one solvent selected from the group consisting of alcohols, ethers, esters, ketones, aromatic hydrocarbons, and glycol ethers, and having a boiling point of 180° C. or less, to thereby obtain a mixture;
then dispersing the mixture in a medium mill, to thereby obtain a first dispersion liquid;
adding and mixing a second solvent comprising at least one solvent selected from the group consisting of vegetable oils and vegetable oil-derived compounds into the first dispersion liquid, to thereby obtain a second dispersion liquid;
removing from the second dispersion liquid the first solvent until a residual content of the first solvent in the second dispersion liquid is 1.15 mass % or more and 4.20 mass % or less, to thereby obtain a near infrared absorbing fine particle dispersion liquid, wherein a content of the near infrared absorbing fine particles in the near infrared absorbing fine particle dispersion liquid is 25 mass % or more and 75 mass % or less.

12. The method for producing a near infrared absorbing fine particle dispersion liquid according to claim 11, wherein a concentration of the near infrared absorbing fine particles in the first dispersion liquid is 5 mass % or more and 50 mass % or less.

13. The method for producing a near infrared absorbing fine particle dispersion liquid according to claim 11, wherein a dispersant, which is soluble in the second solvent and has a fatty acid in its structure, is added to the second solvent.

14. A method for producing a near Infrared absorbing fine particle dispersion liquid, comprising:
mixing a first solvent comprising at least one solvent selected from the group consisting of alcohols, ethers, esters, ketones, aromatic hydrocarbons, and glycol ethers, and having a boiling point of 180° C. or less, and a second solvent comprising at least one solvent selected from the group consisting of vegetable oils and vegetable oil-derived compounds, to thereby obtain a mixed solvent;
mixing infrared absorbing fine particles selected from the group consisting of: fine particles of a composite tungsten oxide expressed by $M_xW_yO_z$ in which M is at least one element selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I,
W is tungsten,
O Is oxygen, and
$0.001 \leq x/y \leq 1$ and $2.2 \leq z/y \leq 3.0$, and
fine particles of a tungsten oxide having a Magneli phase and expressed by a general formula $W_yO_z$ in which
W is tungsten,
O is oxygen, and
$2.485 \leq z/y \leq 2.999$,
into the mixed solvent to obtain a mixture, and dispersing the mixture in a wet medium mill, to thereby obtain a dispersion liquid; and
removing from the dispersion liquid the first solvent until a residual concentration of the first solvent in the dispersion liquid is 1.15 mass % or more and 4.20 mass % or less, to thereby obtain a near infrared absorbing fine particle dispersion liquid, wherein a content of the near Infrared absorbing fine particles in the near Infrared absorbing fine particle dispersion liquid is 25 mass % or more and 75 mass % or less.

15. The method for producing a near infrared absorbing fine particle dispersion liquid according to claim 14, wherein a concentration of the near infrared ray absorbing fine particles in the dispersion liquid is 5 mass % or more and 50 mass % or less.

* * * * *